( 12 ) United States Patent
Sano et al.

(10) Patent No.: US 7,227,870 B2
(45) Date of Patent: Jun. 5, 2007

(54) SYSTEMS INCLUDING PACKET INTERFACES, SWITCHES, AND PACKET DMA CIRCUITS FOR SPLITTING AND MERGING PACKET STREAMS

(75) Inventors: Barton J. Sano, Fremont, CA (US); Laurent R. Moll, Saratoga, CA (US); Manu Gulati, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 1057 days.

(21) Appl. No.: 10/270,016

(22) Filed: Oct. 11, 2002

(65) Prior Publication Data

US 2003/0095559 A1 May 22, 2003

Related U.S. Application Data

(60) Provisional application No. 60/380,740, filed on May 15, 2002, provisional application No. 60/348,777, filed on Jan. 14, 2002, provisional application No. 60/348,717, filed on Jan. 14, 2002, provisional application No. 60/344,713, filed on Dec. 24, 2001, provisional application No. 60/331,789, filed on Nov. 20, 2001.

(51) Int. Cl.
*H04L 12/56* (2006.01)
(52) U.S. Cl. .................. 370/419; 375/372; 370/463
(58) Field of Classification Search ................ 375/372; 370/463, 220, 388; 709/238
See application file for complete search history.

(56) References Cited

U.S. PATENT DOCUMENTS

| 4,788,679 | A | 11/1988 | Kataoka et al. |
| 5,644,753 | A | 7/1997 | Ebrahim et al. |
| 5,805,590 | A | 9/1998 | Gillard et al. |
| 5,953,314 | A * | 9/1999 | Ganmukhi et al. ......... 370/220 |
| 5,963,745 | A | 10/1999 | Collins et al. |
| 6,009,426 | A | 12/1999 | Jouenne et al. |
| 6,094,715 | A | 7/2000 | Wilkinson et al. |
| 6,108,739 | A | 8/2000 | James et al. |
| 6,128,728 | A | 10/2000 | Dowling |
| 6,138,217 | A | 10/2000 | Hamaguchi |
| 6,185,520 | B1 | 2/2001 | Brown et al. |
| 6,195,739 | B1 | 2/2001 | Wright et al. |

(Continued)

FOREIGN PATENT DOCUMENTS

DE 199 07 200 9/1999

(Continued)

OTHER PUBLICATIONS

EP Search Report for EP app 02025691.3, Broadcom Corp.

(Continued)

*Primary Examiner*—Chi Pham
*Assistant Examiner*—Albert T. Chou
(74) *Attorney, Agent, or Firm*—Garlick Harrison & Markison

(57) ABSTRACT

An integrated circuit includes receive circuits for receiving packets, transmit circuits for transmitting packets, a packet DMA circuit for communicating packets to and from a memory controller, and a switch for selectively coupling the receive circuits to transmit circuits. The integrated circuit may flexibly merge and split the packet streams to provide for various packet processing/packet routing functions to be applied to different packets within the packet streams. An apparatus may include two or more of the integrated circuits, which may communicate packets between respective receive and transmit circuits.

21 Claims, 8 Drawing Sheets

U.S. PATENT DOCUMENTS

| | | | | |
|---|---|---|---|---|
| 6,226,338 B1* | 5/2001 | Earnest | ............ | 375/372 |
| 6,266,731 B1 | 7/2001 | Riley et al. | | |
| 6,298,370 B1 | 10/2001 | Tang et al. | | |
| 6,457,058 B1* | 9/2002 | Ullum et al. | ............ | 709/238 |
| 2004/0095927 A1* | 5/2004 | Chang et al. | ............ | 370/388 |
| 2004/0141521 A1* | 7/2004 | George | ............ | 370/463 |

FOREIGN PATENT DOCUMENTS

| | | |
|---|---|---|
| EP | 265 636 | 10/1986 |
| EP | 920 157 | 11/1998 |
| EP | 893 766 | 1/1999 |
| EP | 777 179 | 5/2002 |
| WO | 98/15155 | 4/1998 |
| WO | WO 00/38069 | 6/2000 |

OTHER PUBLICATIONS

Giorgi et al.; PSCR: A Coherence Protocol for Eliminating Passive Sharing in Shared-Bus Shared-Memory Multiprocessors; IEEE Transactions on Parallel and Distributed Systems; vol. 10, No. 7, Jul. 1999.

Intel, "21143 PCI/CardBus 10/100Mb/s Ethernet LAN Controller," Hardware Reference Manual, Revision 1.0, Oct. 1998, 219 pages.

Tom R. Halfhill, "SiByte Reveals 64-Bit Core For NPUs; Independent MIPS64 Design Combines Low Power, High Performance," Microdesign Resources, Jun. 2000, Microprocessor Report, 4 pages.

SiByte, "SiByte Technology," http://sibyte.com/mercurian/technology.htm, Jan. 15, 2001, 3 pages.

SiByte, "The Mercurian Processor," http://sibyte.com/mercurian, Jan. 15, 2001, 2 pages.

SiByte, "Fact Sheet," SB-1 CPU, Oct. 2000, rev. 0.1, 1 page.

SiByte, "Fact Sheet," SB-1250, Oct. 2000, rev. 0.2, 10 pages.

Stepanian, SiByte, SiByte SB-1 MIPS64 CPU Core, Embedded Processor Forum 2000, Jun. 13, 2000, 15 pages.

Jim Keller, "The Mercurian Processor: A High Performance, Power-Efficient CMP for Networking," Oct. 10, 2000, 22 pages.

SiByte, "Target Applications," http://sibyte.com/mercurian/applications.htm, Jan. 15, 2001, 2 pages.

European Search Report for EP 26007-034/zp (02025688.9-2416-) mailed Feb. 27, 2003, 3 pages.

* cited by examiner

SYSTEMS INCLUDING PACKET INTERFACES, SWITCHES, AND PACKET DMA CIRCUITS FOR SPLITTING AND MERGING PACKET STREAMS

This application claims benefit of priority to U.S. Provisional Patent Application Ser. No. 60/380,740, filed May 15, 2002. This application claims benefit of priority to U.S. Provisional Patent Application Ser. No. 60/331,789, filed Nov. 20, 2001. This application claims benefit of priority to U.S. Provisional Patent Application Ser. No. 60/344,713, filed Dec. 24, 2001. This application claims benefit of priority to U.S. Provisional Patent Application Ser. No. 60/348,777, filed Jan. 14, 2002. This application claims benefit of priority to U.S. Provisional Patent Application Ser. No. 60/348,717, filed Jan. 14, 2002.

BACKGROUND OF THE INVENTION

1. Field of the Invention

This invention is related to the field of packet processing and, more particularly, to integrated circuits for processing packets.

2. Description of the Related Art

As computer systems and other electronic systems become increasingly networked, packet processing has become increasingly important as well. Generally, packets are used to communicate among networked computer and electronic systems. Thus, each networked system must receive and transmit packets, and must process the packets directed to that system to determine what is being transmitted to that system.

Typically, each system includes one or more interfaces on which packets are transmitted and received. Packets received on each interface (a "packet stream") are processed within the system. If packets may be processed at multiple points in the system (or if packets may be routed through the system without additional processing within the system), a mechanism for splitting and merging packets from various packet streams to form other packet streams (and to separate packets from the streams to be processed in the system) is needed.

SUMMARY OF THE INVENTION

In one embodiment, an apparatus includes a first receive circuit, a second receive circuit, a plurality of transmit circuits, a packet direct memory access (DMA) circuit, and a switch. The first receive circuit, second receive circuit, plurality of transmit circuits, packet DMA circuit, and switch are integrated onto an integrated circuit. The first receive circuit is configured to couple to a first interface to receive a first plurality of packets. The first receive circuit is configured, for each packet of the first plurality of packets, to select a destination from one of a plurality of destinations. Similarly, the second receive circuit is configured to couple to a second interface to receive a second plurality of packets and is configured, for each packet of the second plurality of packets, to select a destination from one of the plurality of destinations. The plurality of transmit circuits are configured to transmit packets on respective interfaces. The packet DMA circuit is configured to communicate packets to and from a memory controller. The plurality of destinations include the plurality of transmit circuits and the packet DMA circuit. Coupled to the first receive circuit, the second receive circuit, and the plurality of destinations, the switch is configured to couple the first receive circuit and the second receive circuit to select ones of the plurality of destinations to convey packets from the first receive circuit and the second receive circuit to the select ones of the plurality of destinations. A computer accessible medium comprising one or more data structures representing the apparatus is also contemplated.

In another embodiment, an apparatus includes a first integrated circuit and a second integrated circuit. The first integrated circuit has a first plurality of interface circuits, wherein the first integrated circuit is configured to receive a first plurality of packets in a first interface circuit of the first plurality of interface circuits and a second plurality of packets in a second interface circuit of the first plurality of interface circuits. The first interface circuit is configured to select a destination from a plurality of destinations for each of the first plurality of packets. Similarly, the second interface circuit is configured to select a destination from the plurality of destinations for each of the second plurality of packets. The plurality of destinations includes the first plurality of interface circuits and a packet DMA circuit, wherein the packet DMA circuit is configured to communicate packets to and from a memory controller. The first integrated circuit further includes a switch configured to couple the first interface circuit and the second interface circuit to select ones of the plurality of destinations to transmit packets. The second integrated circuit has a second plurality of interface circuits. A third interface circuit of the second plurality of interface circuits is coupled to a fourth interface circuit of the first plurality of interface circuits, wherein the second integrated circuit is configured to receive a third plurality of packets on the third interface circuit, the third plurality of packets transmitted by the fourth interface circuit and including at least a first packet of the first plurality of packets and at least a second packet of the second plurality of packets, the first packet and the second packet having the fourth interface circuit as the destination in the first integrated circuit. A computer accessible medium comprising one or more data structures representing the apparatus is also contemplated.

A method is contemplated. A first plurality of packets are received in a first receive circuit of an integrated circuit; A destination from one of a plurality of destinations is selected for each packet of the first plurality of packets. A second plurality of packets are received in a second receive circuit of the integrated circuit. A destination from one of the plurality of destinations is selected for each packet of the second plurality of packets. The first receive circuit and the second receive circuit are coupled to select ones of the plurality of destinations via a switch in the integrated circuit to convey packets. The integrated circuit includes a plurality of transmit circuits configured to transmit packets on respective interfaces of the integrated circuit, and the plurality of destinations includes the plurality of transmit circuits. The integrated circuit further includes a packet direct memory access (DMA) circuit, wherein the packet DMA circuit is configured to communicate packets to and from a memory controller, and wherein the packet DMA circuit is one of the plurality of destinations

BRIEF DESCRIPTION OF THE DRAWINGS

The following detailed description makes reference to the accompanying drawings, which are now briefly described.

Figure 1:
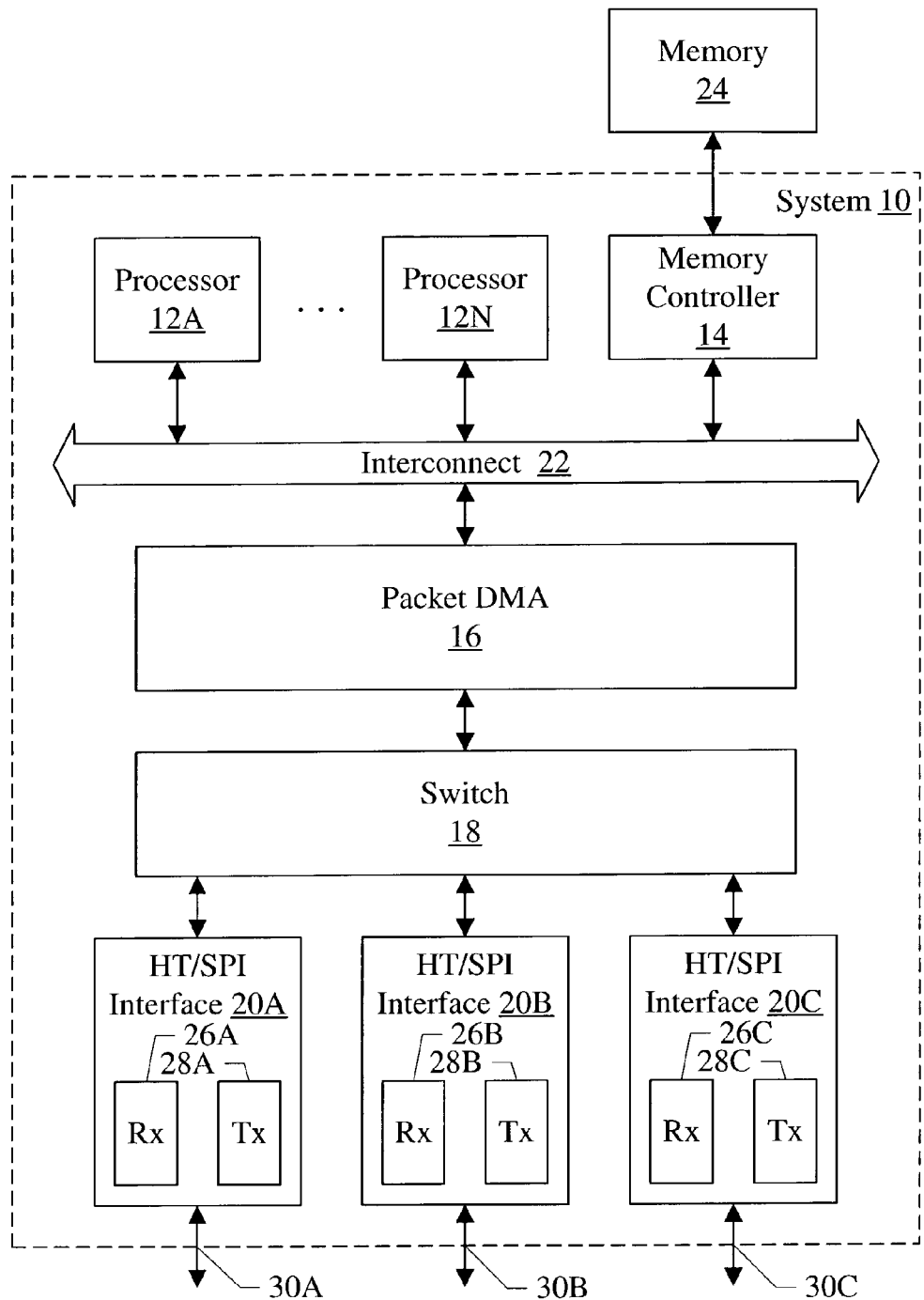
FIG. 1 is a block diagram of one embodiment of a system for packet processing.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a system 10 is shown. In the embodiment of FIG. 1, the system 10 includes one or more processors 12A-12N, a memory controller 14, a packet DMA circuit 16, a switch 18, and a set of interface circuits 20A-20C. The system 10 includes an interconnect 22 to which the processors 12A-12N, the memory controller 14, and the packet DMA circuit 16 are coupled. The system 10 is coupled, through the memory controller 14, to a memory 24. The interface circuits 20A-20C each include a receive (Rx) circuit 26A-26C and a transmit (Tx) circuit 28A-28C. The system 10 is coupled to a set of interfaces 30A-30C through respective interface circuits 20A-20C. The interface circuits 20A-20C are coupled to the switch 18, which is further coupled to the packet DMA circuit 16.

Each of the interface circuits 20A-20C are configured to receive and transmit packets on the respective interfaces 30A-30C to which they are connected. The Rx circuits 26A-26C handle the receiving of packets from the interfaces 30A-30C, and the Tx circuits 28A-28C handle the transmitting of packets on the interfaces 30A-30C.

Each of the interfaces 30A-30C is at least defined to carry packet data. For example, in some embodiments, the interfaces may be system packet interfaces (SPI) according to any level of the SPI specification set forth by the Optical Internetworking Forum (e.g. level 3, level 4, or level 5). In one particular embodiment, the interfaces may be SPI-4 phase 2 interfaces. In other embodiments, the interfaces may be HyperTransport™ (HT) interfaces, which may carry packet data according to a Packet over HyperTransport (PoHT) extension to the HT interface. In the illustrated embodiment, each interface circuit 20A-20C may be configurable to communicate on either the SPI-4 interface or the HT interface. Each interface circuit 20A-20C may be individually programmable, permitting various combinations of the HT and SPI-4 interfaces as interfaces 30A-30C. The programming may be performed in any fashion (e.g. sampling certain signals during reset, shifting values into configuration registers (not shown) during reset, programming the interfaces with configuration space commands after reset, pins that are tied up or down externally to indicate the desired programming, etc.). Other embodiments may employ any interface capable of carrying packet data (e.g. the Media Independent Interface (MII) or the Gigabit MII (GMII) interfaces, X.25, Frame Relay, Asynchronous Transfer Mode (ATM), etc.). The interfaces may carry packet data directly (e.g. transmitting the packet data with various control information indicating the start of packet, end of packet, etc.) or indirectly (e.g. transmitting the packet data as a payload of a command, such as PoHT). As used herein, an interface circuit includes any circuitry configured to communicate on an interface according to the protocol defined for the interface. The interface circuit may include receive circuitry configured to receive communications on the interface and transmit the received communications to other circuitry internal to the system that includes the interface circuit. The interface circuit may also include transmit circuitry configured to receive communications from the other circuitry internal to the system and configured to transmit the communications on the interface.

Generally, the interface circuits 20A-20C (and more particularly the Rx circuits 26A-26C in the illustrated embodiment) are each configured to receive a packet stream on the corresponding interface 30A-30C. A packet stream is a plurality of packets received over time on the interface. For each packet in the stream, the receiving Rx circuit 26A-26C may determine a destination for the packet within the system 10. The destination may be one of the Tx circuits 28A-28C, or may be the packet DMA circuit 16. Different packets in the stream may have different destinations. Thus, the Rx circuits 26A-26C (in conjunction with the switch 18) may split a received packet stream among multiple destinations.

The interface circuits 20A-20C (and more particularly the Tx circuits 28A-28C in the illustrate embodiment) are each configured to transmit a packet stream on the corresponding interface 30A-30C. The packet stream may be sourced from multiple sources within the system 10. For example, the Rx circuits 26A-26C may be the source for packets (e.g. packets received on the corresponding interface 30A-30C for which the destination is determined to be a Tx circuit 28A-28C). The packet DMA circuit 16 may also be a source for packets (e.g. packets generated by software executing on the processors 12A-12N or packets received from the interfaces 30A-30C, processed by the software, and returned to the packet DMA circuit 16 for retransmission). The packet stream transmitted by a given Tx circuit 28A-28C may include packets merged from multiple packet sources.

The system 10 may provide a flexible structure for processing packets and for routing packets without processing by the processors 12A-12N. In other words, packets may be routed through the system 10 without touching the packet DMA circuit 16 and with being sent to or sourced by the packet DMA circuit 16. Other packets may be sent to or sourced by the packet DMA circuit 16, and these packets may be split from or merged into packet streams with other packets that do not touch the packet DMA circuit 16. In one embodiment, the Rx circuits 26A-26C may be programmable to select destinations for packets based on one or more packet attributes. For example, packets may be transmitted on the interfaces 30A-30C in a virtual channel on that interface. The virtual channel may be a packet attribute used for selecting a destination. Additionally, the Rx circuits 26A-26C may be programmable to select one or more packet fields to use in determining a destination. For packets generated by software, the software may select a destination for the packet (e.g. by selecting an output queue in the packet DMA circuit 16 mapped to a given Tx circuit 28A-28C and to a virtual channel on the corresponding interface).

Figure 3:
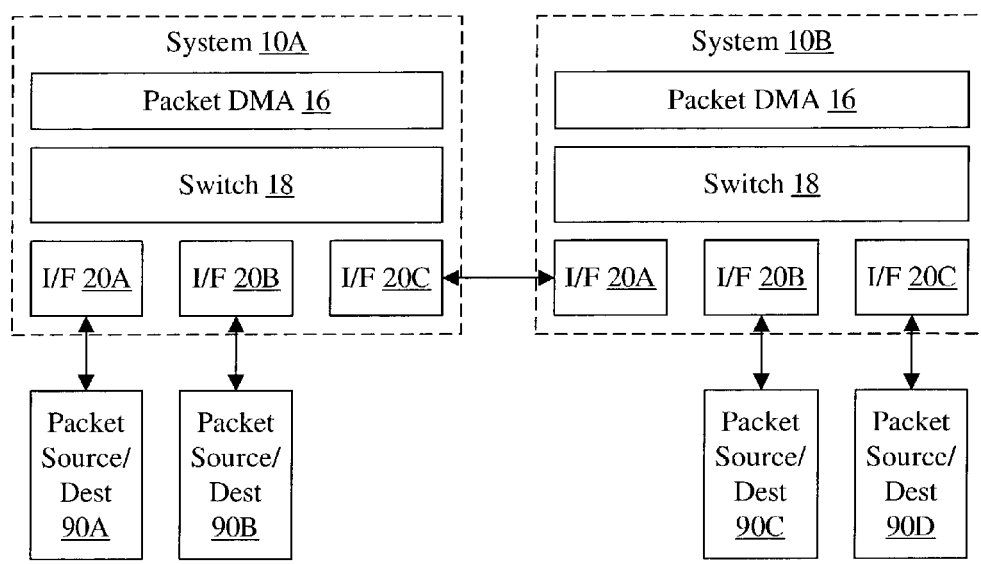
FIG. 3 is a block diagram of one embodiment of a packet processing system including multiple systems shown in FIG. 1.

Two or more instantiations of the system 10 may be coupled together to form packet processing systems in which packets are routed among the systems as well as packet source/destination devices. An example of such a packet processing system is shown in FIG. 3 and described in more detail below.

If the Rx circuit 26A-26C receives a packet and determines that the destination for the packet is a Tx circuit 28A-28C, the Rx circuit 26A-26C may transmit the packet through the switch 18 to the Tx circuit 28A-28C. The packet may not be transmitted to memory (i.e. may not be transmitted to the packet DMA circuit 16), nor acted upon by the processors 12A-12N. Thus, memory bandwidth, storage, and processor time may be used to process packets which are not automatically routed (by the Rx circuits and Tx circuits without processing by the processors 12A-12N or passing through the packet DMA circuit 16) from a source to a destination. In packet processing systems including multiple systems 10, a packet may be routed from an Rx circuit 26A-26C to a Tx circuit 28A-28C that is coupled to an interface to the other system 10, and the Rx circuit 28A-28C in the other system 10 that is coupled to that interface may determine that the destination of the packet is the packet DMA circuit 16 in the other system 10. Alternatively, a packet may be routed through one or more Rx and Tx circuits 26A-26C and 28A-28C from a packet source device to a packet destination device, without any processing by processors 12A-12N in the systems 10.

The packet DMA circuit 16 comprises circuitry shared by the interface circuits 20A-20C. The packet DMA circuit 16 circuitry communicates packets between the interface circuits 20A-20C and the memory 24. The packet DMA circuit may generate write commands to the memory controller 14 to write received packets to the memory 24, and may generate read commands to read packets from the memory 24 for transmission by one of the interface circuits 20A-20C. In some embodiments, the packet DMA circuit 16 may be provided with descriptors indicating the memory locations for reading and writing packets. The packet DMA circuit 16 may also generate read commands and write commands to read and write the descriptors.

Packets stored to memory by the packet DMA circuit 16 may be processed by software executed by the processors 12A-12N. The software may determine that a given packet is terminated in the system 10. Alternatively, the processors 12A-12N may determine that the packet is to be retransmitted on one of the interfaces 30A-30C, and may prepare the packet for transmission by the packet DMA circuit 16. The packet may have been modified by software, or may be unmodified. Additionally, the software may generate packets to be transmitted. In any of these cases, the software may inform the packet DMA circuit 16 of the packet and its location in the memory 24, so that the packet DMA circuit 16 may read the packet from the memory 24 for transmission to the interface circuit 20A-20C coupled to the interface 30A-30C on which the packet is to be transmitted.

The switch 18 may selectively couple the interface circuits 20A-20C (and particularly the Rx circuits 26A-26C in the illustrated embodiment) to other interface circuits 20A-20C (and particularly the Tx circuits 28A-28C in the illustrated embodiment) or to the packet DMA circuit 16 to transfer received packet data. The switch 18 may also selectively couple the packet DMA circuit 16 to the interface circuits 20A-20C (and particularly to the Tx circuits 28A-28C in the illustrated embodiment) to transfer packet data from the packet DMA circuit 16 to the interface circuits 20A-20C for transmission on the corresponding interface 30A-30C. The switch 18 may have request/grant interfaces to each of the interface circuits 20A-20C and the packet DMA circuit 16 for requesting transfers and granting those transfers. The switch 18 may have an input path from each source (the Rx circuits 26A-26C and the packet DMA circuit 16) and an output path to each destination (the Tx circuits 28A-28C and the packet DMA circuit 16), and may couple a granted input path to a granted output path for transmission of packet data. The couplings may then be changed to the next granted input path and granted output path. Multiple independent input path/output path grants may occur concurrently.

In one embodiment, the interfaces 30A-30C may support a set of virtual channels in which packets are transmitted. Each virtual channel is defined to flow independent of the other virtual channels, even though the virtual channels may share certain physical resources (e.g. the interface 30A-30C on which the packets are flowing). These virtual channels may be mapped to internal virtual channels (referred to as switch virtual channels herein). The switch 18 may be virtual-channel aware. That is, the switch 18 may grant a coupling between a source and a destination based not only on the ability of the source to transfer data and the destination to receive data, but also on the ability of the source to transfer data in a particular switch virtual channel and the destination to receive data on that switch virtual channel. Thus, requests from sources may indicate the destination and the virtual channel on which data is to be transferred, and requests from destinations may indicate the virtual channel on which data may be received. Additionally, in some embodiments, the switch 18 may merge inputs to a given destination virtual channel on a packet boundary. That is, if two sources are requesting to transfer packet data to the same destination and virtual channel, and one of the sources has been granted to that destination and virtual channel, the switch inhibits granting to the other source for that destination and virtual channel until the current source reaches a packet boundary.

As used herein, a "packet" may include any communication between a source and a destination which includes one or more headers defining the source and destination of the packet at various levels within the source and destination and which may include a data payload. "Packet data" may include any data that is part of a packet, or may refer to multiple packets.

The processors 12A-12N may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. The system 10 may include any number of processors (e.g. as few as one processor, two processors, four processors, etc.).

The memory controller 14 is configured to access the memory 24 in response to read and write commands received on the interconnect 22. In some embodiments, an L2 cache may be coupled to the interconnect 22 for caching various blocks from the memory 24 for more rapid access by agents coupled to the interconnect 22. In such embodiments, the memory controller 14 may receive a hit signal from the L2 cache, and if a hit is detected in the L2 cache for a given read/write command, the memory controller 14 may not respond to that command. Generally, a read command causes a transfer of data from the memory 24 (although some read commands may be serviced from a cache such as an L2 cache or a cache in the processors 12A-12N) and a write command causes a transfer of data to the memory 24 (although some write commands may be serviced in a cache, similar to reads). The memory controller 14 may be designed to access any of a variety of types of memory. For example, the memory controller 14 may be designed for synchronous dynamic random access memory (SDRAM), and more particularly double data rate (DDR) SDRAM. Alternatively, the memory controller 16 may be designed for DRAM, DDR synchronous graphics RAM (SGRAM), DDR fast cycle RAM (FCRAM), DDR-II SDRAM, Rambus DRAM (RDRAM), SRAM, or any other suitable memory device or combinations of the above mentioned memory devices.

It is noted that, in some embodiments which employ an L2 cache, the packet DMA circuit 16 may be configured to cause packets (or portions thereof, such as the portion likely to include the header) to be stored into the L2 cache as well as the memory 24. The packet DMA circuit 16 may be programmable as to which portions of the packets to stored into the L2 cache.

The interconnect 22 may be any form of communication medium between the devices coupled to the interconnect. For example, in various embodiments, the interconnect 22 may include shared buses, crossbar connections, point-to-point connections in a ring, star, or any other topology, meshes, cubes, etc. The interconnect 22 may also include storage, in some embodiments. In one particular embodiment, the interconnect 22 may comprise a bus. The bus may be a split transaction bus, in one embodiment (i.e. having separate address and data phases). The data phases of various transactions on the bus may proceed out of order with the address phases. The bus may also support coherency and thus may include a response phase to transmit coherency response information. The bus may employ a distributed arbitration scheme, in one embodiment. In one embodiment, the bus may be pipelined. The bus may employ any suitable signaling technique. For example, in one embodiment, differential signaling may be used for high speed signal transmission. Other embodiments may employ any other signaling technique. Other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus may not be pipelined, if desired.

Various embodiments of the system 10 may include additional circuitry, not shown in FIG. 1. For example, the system 10 may include various I/O devices and/or interfaces. Exemplary I/O may include one or more PCI interfaces, one or more serial interfaces, Personal Computer Memory Card International Association (PCMCIA) interfaces, etc. Such interfaces may be directly coupled to the interconnect 22 or may be coupled through one or more I/O bridge circuits.

In one embodiment, the system 10 (and more particularly the processors 12A-12N, the memory controller 14, the interface circuits 20A-20C, the packet DMA circuit 16, the switch 18, and the interconnect 22) may be integrated onto a single integrated circuit as a system on a chip configuration. The additional circuitry mentioned above may also be integrated. Alternatively, other embodiments may implement one or more of the devices as separate integrated circuits. In another configuration, the memory 24 may be integrated as well. Alternatively, one or more of the components may be implemented as separate integrated circuits, or all components may be separate integrated circuits, as desired. Any level of integration may be used.

It is noted that, while three interface circuits 20A-20C are illustrated in FIG. 1, two or more interface circuits may be implemented in various embodiments.

Figure 2:
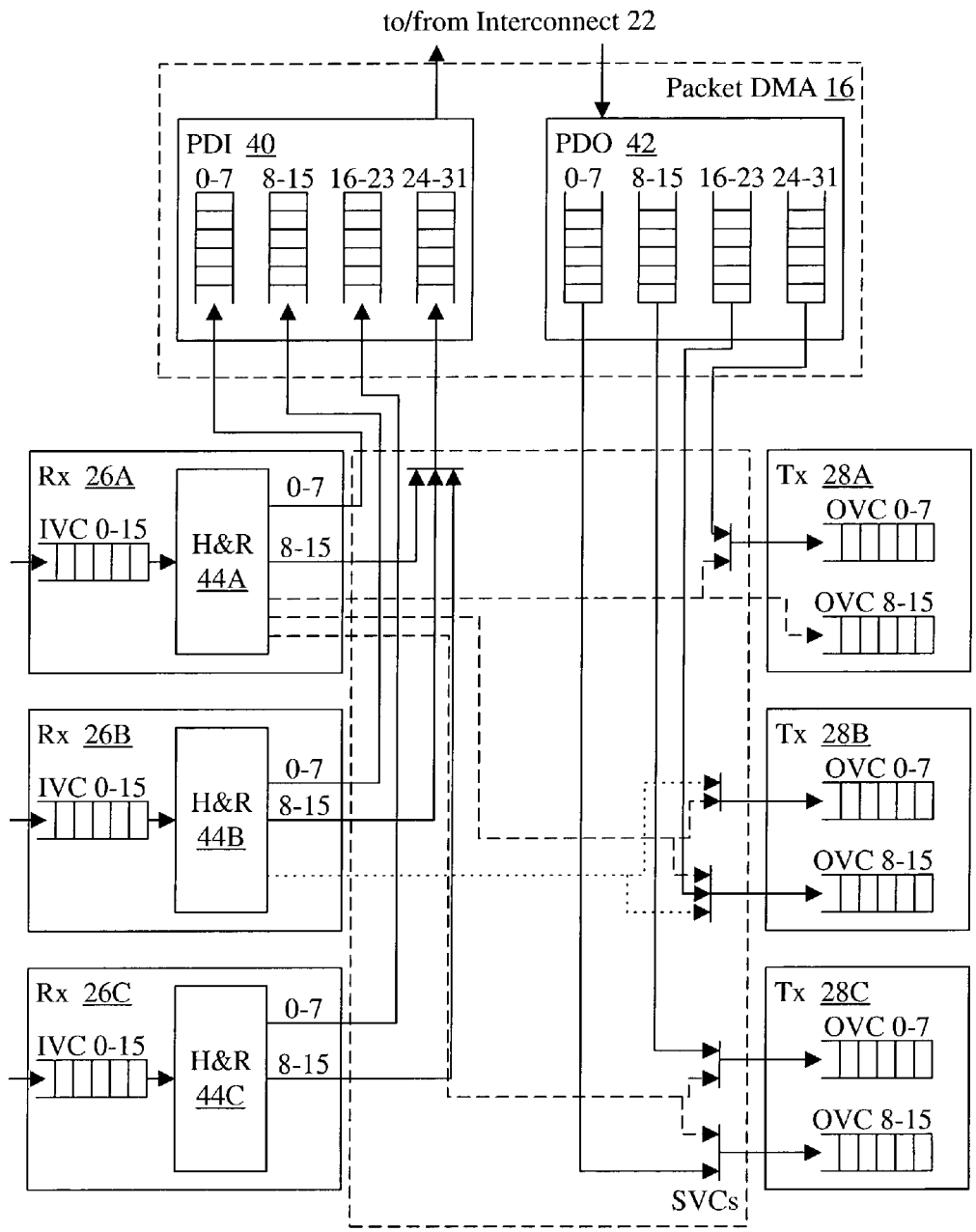
FIG. 2 is a block diagram illustrating one embodiment of virtual channels in the system of FIG. 1.

Turning now to FIG. 2, a block diagram illustrating one embodiment of virtual channels in the system 10 is shown, as well as examples of splitting and merging packet traffic. In the illustrated embodiment, the Rx circuits 26A-26C and the Tx circuits 28A-28C are shown. Additionally, the packet DMA circuit 16 is shown as including an input packet DMA circuit (PDI) 40 and an output packet DMA circuit (PDO) 42. The PDI 40 is coupled to transmit write commands on the interconnect 22 to write received packets to memory. The PDO 42 is coupled to transmit read commands on the interconnect 22 and to receive the read data comprising packets to be transmitted from the system 10. Additionally, as mentioned above, each of the PDI 40 and the PDO 42 may be configured to read and write descriptors defining the locations in memory to which the packets are to be read and written.

Each Rx circuit 26A-26C supports a set of input virtual channels (IVCs) defined by the interface from which the Rx circuit receives packet data. For example, the SPI-4 interface and the HT interface may both support 16 virtual channels in hardware (although more may be used by software in the SPI-4 interface, since an 8 bit virtual channel value is supported). Thus, each Rx circuit 26A-26C supports 16 IVCs (numbered 0-15 in FIG. 2). Similarly, each Tx circuit 28A-28C supports 16 output virtual channels (OVCs), numbered 0-15 in FIG. 2. Other embodiments may employ more or fewer IVCs and OVCs according to the interfaces supported by those embodiments. The PDI 40 includes a logical set of input queues (e.g. 32 in the illustrated embodiment, numbered 0-31, although more or fewer input queues may be included in other embodiments). The PDO 42 includes a logical set of output queues (e.g. 32 in the illustrated embodiment, numbered 0-31, although more or fewer output queues may be included in other embodiments).

Each Rx circuit 26A-26C includes a hash and route (H&R) circuit 44A-44C in the illustrated embodiment, which maps packets from the IVCs to a switch virtual channel (SVC). The SVC is used as the internal virtual channel for the system 10, and in particular is used to transmit packets through the switch 18 to the packet DMA circuit 16 or to the Tx circuits 28A-28C. Viewed in another way, requests to transmit packet data through the switch 18 are made based on the SVC of the packet, which identifies both the destination of the packet and the virtual channel at the destination. The SVC may also be referred to herein as a destination and the virtual channel at the destination.

In the illustrated embodiment, the H&R circuits 44A-44C may map the IVCs to one of 16 PDI VCs (numbered 0-15 in FIG. 2, using solid lines from the H&R circuits 44A-44C). These PDI VCs may be further mapped to input queues in the PDI 40, e.g. using a register to which the H&R circuit 44A is coupled (see FIG. 5 below). That is, VCs at the PDI 40 may correspond directly to input queues, or input queues may each be a VC in the PDI 40. In the illustrated embodiment, PDI VCs are mapped to input queues in blocks of eight (e.g. PDI VC 0 is input queue 0, 8, 16, or 24; PDI VC 1 is input queue 1, 9, 17, or 25; etc.). In other embodiments, each PDI VC may be individually mappable to an input queue, or other sized blocks of input queues may be mappable to PDI VCs. In yet another embodiment, the H&R circuits 44A-44C may directly map IVCs to PDI input queues (e.g. without the intermediate step of PDI VCs). Additionally, the H&R circuits 44A-44C may map packets from an IVC to an OVC in one of the Tx circuits 28A-28C, illustrated for H&R circuit 44A with dashed lines through the SVCs block to the Tx circuits 28A-28C.

The H&R circuits 44A-44C may be used to split packets from the same IVC to different SVCs (e.g. different input queues in the PDI and/or OVCs in the Tx circuits 28A-28C). Thus, the H&R circuits 44A-44C may provide software flexibility to separate packets for processing versus packets to be passed through the Tx circuits 28A-28C based on various packet attributes (such as header values), or may provide for separating packets into different input queues in the PDI 40 (e.g. for different types of processing) based on various packet attributes. The H&R circuits 44A-44C may also be programmed to map IVCs to SVCs without using any additional packet attributes, or a combination of such mappings and other mappings using additional packet attributes, as desired. In other embodiments, the Rx circuits 26A-26B may not include H&R circuits and may instead use a programmable or fixed mapping of each IVC to a specified SVC (Tx circuit 28A-28C and OVC in that circuit or PDI 40 and an input queue in the PDI 40). It is noted that packets which are routed from an Rx circuit 26A-26C directly to a Tx circuit 28A-28C bypass the packet DMA circuit 16, the memory 24, and processing by the processors 12A-12N.

The PDO 42 output queues are also mapped to various Tx circuits 28A-28C and to OVCs in those Tx circuits 28A-28C. In the illustrated embodiment, output queues are mapped to Tx circuits and OVCs in blocks of 8, similar to the mapping of IVCs to input queues. Other embodiments may map output queues individually, or in other-sized blocks, as desired. In one embodiment, the PDO 42 includes a configuration register or registers programmed with the mapping of each block of 8 output queues to a corresponding group of SVCs (which identify the Tx circuit 28A-28C and the OVC within that Tx circuit). Other embodiments may use more elaborate mapping mechanisms similar to H&R circuits, to map packets based on packet attributes in addition to output queues, if desired.

FIG. 2 illustrates, via the solid arrows between the H&R circuits 44A-44C and the PDI 40, an exemplary mapping from the PDI VCs of the H&R circuits 44A-44C to the input queues of the PDI 40. The exemplary mapping is but one example of the mappings that may be used, as programmed into the Rx circuits 26A-26C by software. In the example, PDI VCs 0-7 from the H&R circuit 44A are mapped to input queues 0-7; PDI VCs 0-7 from the H&R circuit 44B are mapped to input queues 8-15; PDI VCs 0-7 from the H&R circuit 44C are mapped to input queues 16-23; and PDI VCs 8-15 from each of the H&R circuits 44A-44C are merged to input queues 24-31. When mappings merge the PDI VCs from different H&R circuits 44A-44C, the switch 18 may perform the merging on packet boundaries. That is, when a given Rx circuit 26A-26C has been granted to transfer a packet to an input queue that is merged among the Rx circuits 26A-26C, the switch inhibits granting any other Rx circuit 26A-26C on that input queue until the granted Rx circuit 26A-26C reaches a packet boundary. Any combination of PDI VCs from different Rx circuits 26A-26C may be merged into input queues, as desired in various mappings.

FIG. 2 also illustrates, via the solid arrows between the PDO 42 and the Tx circuits 28A-28C, an exemplary mapping of output queues to Tx circuits and OVCs. The exemplary mapping is but one example of mappings that may be used, as programmed by software. In the illustrated mapping, output queues 0-7 are mapped to OVCs 8-15 in the Tx circuit 28C; output queues 8-15 are mapped to OVCs 0-7 in the Tx circuit 28C; output queues 16-23 are mapped to OVCs 8-15 in the Tx circuit 28B; and output queues 24-31 are mapped to OVCs 0-7 in the Tx circuit 28A. Additionally, Rx circuits 26A-26C may map IVCs to OVCs, and thus there may be merging of packets from Rx circuits 26A-26C and output queues to an OVC. Again, the switch 18 may handle this merging on packet boundaries.

As mentioned above, there may be mappings of IVCs in Rx circuits 26A-26C to OVCs in the Tx circuits 28A-28C. In FIG. 2, for example, dashed lines illustrate possible mappings from the Rx circuit 26A IVCs (via the H&R circuit 44A) to the OVCs of the Tx circuits 28A-28C. Additionally, a dotted line from the Rx circuit 26B (the H&R circuit 44B) to the Tx circuit 28B OVCs illustrates the possible merging of packet streams from various Rx circuits 26A-26C to a given Tx circuit 28A-28C. Again, the switch 18 may merge packets from different Rx circuits 26A-26C to a given OVC on a packet boundary basis. Merging may occur between any combination of Rx circuits 26A-26C and the PDO 42.

The input queues of the PDI 40 and the output queues of the PDO 42 may be logical queues. That is, the queues may actually be implemented in memory 24. The PDI 40 and the PDO 42 may include buffers to buffer the packet data being transmitted to and from the memory 24. The queues may be implemented in any fashion. In one particular embodiment, each queue is implemented as a descriptor ring (or chain) which identifies memory buffers to store packet data corresponding to a given input queue. In other embodiments, the queues may be implemented in any desired fashion (e.g. linked lists, contiguous memory locations for the packet memory buffers, etc.). The PDI 40 and the PDO 42 may generate read and write commands to fetch and update descriptors.

It is noted that, while the Rx circuits 26A-26C and the Tx circuits 28A-28C are described as supporting various virtual channels for packets, in some embodiments these circuits may support additional virtual channels for other types of traffic. For example, the HT interface is capable of carrying non-packet traffic (e.g. I/O traffic) in additional virtual channels. Additionally, in one embodiment, the HT interface may support coherent virtual channels (that is, virtual channels that carry coherent traffic) for transactions used to maintain coherency among devices on the HT interface. The Rx circuits 26A-26C and the Tx circuits 28A-28C may be designed to additionally route data received on these VCs according to the HT definition and/or coherency requirements.

Turning now to FIG. 3, a block diagram of one embodiment of a packet processing system 80 is shown. In the illustrated packet processing system 80, two systems 10 (system 10A and system 10B) are included. Illustrated in FIG. 3 are the packet DMA circuit 16, the switch 18, and the interface circuits 20A-20C for each of the systems 10A-10B. In the illustrated embodiment, the interface circuit 20A of the system 10A is coupled to an interface to a packet source/destination device 90A; the interface circuit 20B of the system 10A is coupled to an interface to a packet source/destination device 90B; the interface circuit 20C of the system 10A is coupled to an interface to the interface circuit 20A of the system 10B; the interface circuit 20B of the system 10B is coupled to an interface to a packet source/destination device 90C; and the interface circuit 20C of the system 10B is coupled to an interface to a packet source/destination device 90D.

A packet source/destination device 90A-90D may generally be capable of sourcing packets, receiving packets, or both. The packet source/destination devices 90A-90D may include any combination of packet communicating devices. For example, various packet source/destination devices 90A-90D may be computing systems which may communicate with each other via packets. The packet source/destination devices 90A-90D may include various networking devices (e.g. routers, packet switches, gateways, firewalls, concentrators, hubs, etc.). The packet source/destination devices 90A-90D may also include various coprocessor hardware which may be designed to perform certain packet processing functions (e.g. security processors to perform secure internet protocol (IPSec) processing, encryption/decryption engines, coprocessors designed to process specific protocols or protocol extensions, etc.).

The packet processing system 80 may use the packet stream splitting and merging features of the systems 10A-10B in various fashions. For example, if a packet source/destination device (e.g. device 90A) is sourcing packets which are to be processed by the software executing on the processors 12A-12N in the systems 10A-10B, the processing load may be divided by splitting the packet stream from that device 90A. In such a case, the interface circuit 20A in the system 10A may be programmed to split the packet stream into packets for the packet DMA circuit 16 and the interface circuit 20C. The packets received by the packet DMA circuit 16 of the system 10A may be transmitted to memory 24 of the system 10A and may be processed by the software executing on the processors 12A-12N. The packets received by the interface circuit 20C of the system 10A may be transmitted to the interface circuit 20A of the system 10B, which may transmit the packets to the packet DMA circuit 16 of the system 10B. The packet DMA circuit 16 of the system 10B may transmit the packets to the memory 24 of the system 10B and the processors 12A-12N of the system 10B may process those packets. Viewed in another way, the 32 input queues of the PDI 40 in the system 10A and the 32 input queues of the PDI 40 in the system 10B may be viewed, by a packet source/destination device 90A-90B, as 64 input queues for receiving packets to be processed.

In another example, packets sourced by a given packet source/destination device 90A-90D may be split between: (i) packets to be processed (e.g. packets transmitted to the packet DMA circuit 16 of the system 10A and/or the system 10B); and (ii) packets to be transmitted to one or more packet source/destination devices 90A-90D. Still further, packets transmitted by two or more packet source/destination devices may be merged to a packet DMA circuit 16 or a interface circuit 20A-20C for transmission to a packet source/destination device 90A-90D.

It is noted that, while packet source/destination devices 90A-90D are illustrated with bi-directional links to the same interface circuit 20A-20C in the systems 10 in FIG. 3, other embodiments may employ a uni-directional link from a packet source device (that is, a device that only sources packets) or a packet destination device (that is, a device that only sinks packets). In embodiments employing the SPI-4 interface, one SPI-4 link in the desired direction from an interface circuit 20A-20C may be used. For example, if a packet source device were coupled to the interface circuit 20A, the Rx circuit 26A may be used to receive packets from the packet source device via the SPI-4 interface. The Tx circuit 28A may be coupled via the SPI-4 interface to some other device, or may not be used. Similarly, if a packet destination device were coupled to the interface circuit 20A, the Tx circuit 28A may be used to transmit packets to the packet destination device via the SPI-4 interface. The Rx circuit 26A may be coupled via the SPI-4 interface to some other device, or may not be used. Furthermore, in some embodiments, a packet source/destination device may be coupled to one SPI-4 link in one direction to one system 10 (e.g. from the device to the system 10) and to another SPI-4 link in the other direction from another system 10 (e.g. from the system 10 to the device).

While the embodiment of FIG. 3 illustrates two systems 10A-10B, other embodiments may include one system 10 or more than two systems 10, coupled in any desired fashion.

Figure 4:
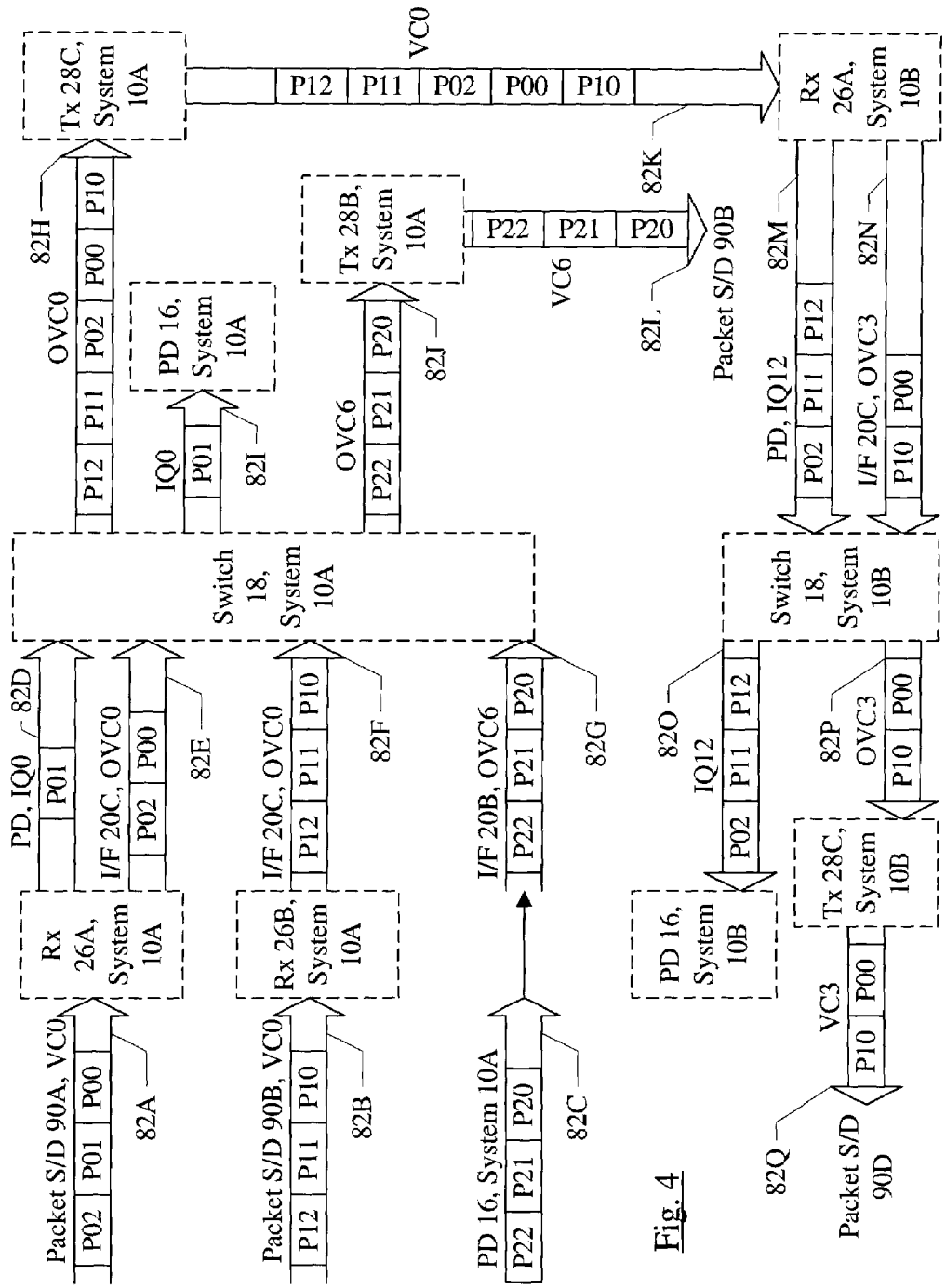
FIG. 4 is a block diagram illustrating one example of packet flow for the system shown in FIG. 3.

Turning now to FIG. 4, a block diagram is shown of an example of splitting and merging of packet streams in the embodiment of the packet processing system 80 shown in FIG. 3. The example of FIG. 4 is but one of numerous examples of splitting and merging packets that maybe possible in the embodiment of the packet processing system 80 shown in FIG. 3 or other embodiments.

In the example of FIG. 4, three source packet streams are shown. The first source packet stream 82A is from the packet source/destination device 90A, and is transmitted on virtual channel 0 (VC0) of the interface between the device 90A and the Rx circuit 26A in the system 10A. Each packet stream shown in FIG. 4 illustrates a time-ordered set of packets, where the first packet (in time) is at the head of the arrow (where the arrow head is located) and subsequent packets in time order are shown in order toward the tail of the arrow. Thus, the packet stream 82A includes a packet P00, followed by a packet P01, followed by a packet P02. Similarly, the packet stream 82B from the packet source/destination device 90B includes the packets P10, P11, and P12 (traveling in VC0 on the interface to the Rx circuit 26B of the system 10A). The packet stream 82C is provided by the packet DMA circuit 16 in the system 10A, in an output queue mapped to the OVC6 in the interface circuit 20B of the system 10A (shown as packet stream 82G in FIG. 4).

For the example of FIG. 4, one virtual channel is shown for each packet stream for convenience. Other virtual channels may generally be included in a packet stream, interleaved with the packets on the virtual channel shown.

The Rx circuit 26A in the system 10A receives the packet stream 82A, and splits the packet stream into two streams 82D and 82E. The stream 82D is mapped to the packet DMA circuit 16 in the system 10A, into input queue 0 (IQ0). The packet stream 82E is mapped to the interface circuit 20C of the system 10A, on OVC0. In this example, the packet stream 82D includes the packet P01 and the packet stream 82E includes the packets P00 and P02. The Rx circuit 26A in the system 10A thus requests transfers to the packet DMA circuit 16 on IQ0 and to the interface circuit 26C on OVC0 from the switch 18 in the system 10A.

The Rx circuit 26B in the system 10A receives the packet stream 82B in this example, and maps the packet stream 82B to the packet stream 82F on the interface circuit 20C in the system 10A, on OVC0. The Rx circuit 26B in the system 10A thus requests transfers to the interface circuit 20C, on OVC0, from the switch 18 in the system 10A. Accordingly, in this example, the packet streams 82E and 82F are merged by the switch 18 of the system 10A.

The switch 18 of the system 10A grants transfers from the various sources (the Rx circuits 26A and 26B and the packet DMA circuit 16) over time, thus generating the packet streams 82H, 82I, and 82J to the Tx circuit 28C in the system 10A, the packet DMA circuit 16 in the system 10A and the Tx circuit 28B in the system 10A, respectively. The packet stream 82H is the merging of the packet streams 82E and 82F. In particular in this example, the packet P10 is selected first from the packet stream 82F, followed by the packets P00 and P02 from the packet stream 82E, followed by the packets P11 and P12 from the packet stream 82F. In other examples, the packets may be interleaved in other orders, dependent on the relative time of arrival of the packets, the arbitration of the switch between the Rx circuits 26A-26B, the availability of transfer on the OVC0 by the Tx circuit 28C, etc. Packets from a given source may remain in relative order (since they are in same IVC in this example), but the order between packets from different sources may differ. The packets may be merged on packet boundaries. The packet stream 82H (on OVC0) is provided to the Tx circuit 28C, which transmits the packet stream (on VC0 of the interface) to the Rx circuit 26A in the system 10B (packet stream 82K). Similarly, the packet stream 82J (on OVC6) is provided to the Tx circuit 28B in the system 10A, which transmits the packet stream on the VC6 of the interface to the packet source/destination device 90B (packet stream 82L). Additionally, the packet DMA circuit 16 in the system 10A receives the packet stream 82I and stores the packet to IQ0 in the memory 24.

The Rx circuit 26A in the system 10B receives the packet stream 82K, and splits the stream into packet streams 82M and 82N to the packet DMA circuit 16 (on IQ12) and the interface 20C (on OVC3), respectively, in this example. In particular, the packet stream 82M includes the packets P02, P11, and P12 from the packet stream 82K and the packet stream 82N includes the packets P10 and P00. Thus, the Rx circuit 26A arbitrates for transfers through the switch 18 of the system 10B for the packet DMA circuit 16, IQ12 and the interface 20C, OVC3 (both in the system 10B). The switch 18 grants transfers over time (according to destination availability), and the packet streams 82O and 82P (corresponding to the packet streams 82M and 82N, respectively) are transmitted to the packet DMA circuit 16 in the system 10B and the Tx circuit 28C in the system 10B, respectively. The Tx circuit 28C in the system 10B transmits the corresponding packet stream 82Q on the interface to the packet source/destination device 90D.

Thus, in this example, a packet P00 from the packet source/destination device 90A is routed through the Rx circuit 26A, the switch 18, and the Tx circuit 28C of the system 10A and the Rx circuit 26A, the switch 18, and the Tx circuit 28C of the system 10B to the packet source/destination device 90D. The packet P01 from the packet source/destination device 90A is routed through the Rx circuit 26A, the switch 18, and the packet DMA circuit 16 of the system 10A for processing in software executed on the processors 12A-12N of the system 10A. The packet P02 from the packet source/destination device 90A is routed through the Rx circuit 26A, the switch 18, and the Tx circuit 28C of the system 10A and the Rx circuit 26A, the switch 18, and the packet DMA circuit 16 of the system 10B for processing in software executed on the processors 12A-12N of the system 10B. Along the way, the packets P00 and P02 are merged with the packets P10, P11, and P12 from the packet source/destination device 90B and the merged stream is split in the system 10B.

As the example of FIG. 4 illustrates, the flexible merging and splitting of packet streams in the systems 10A-10B may be used in packet processing systems such as packet processing system 80 to route packets from multiple sources to multiple destinations in virtually any desired fashion.

Figure 5:
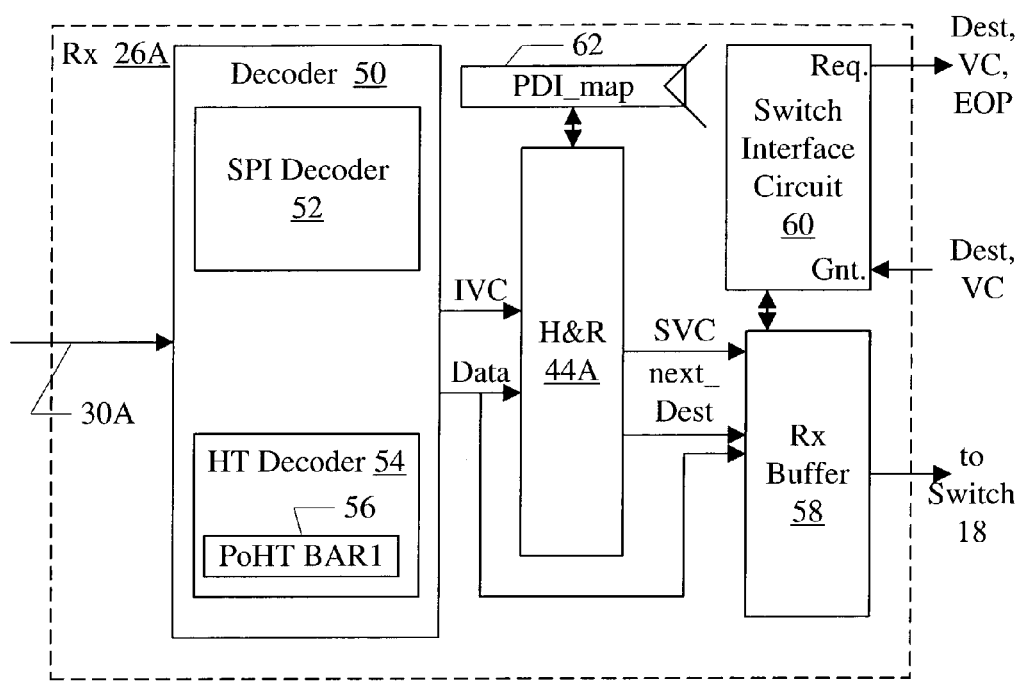
FIG. 5 is a block diagram of one embodiment of a receiver circuit shown in FIG. 1.

Turning next to FIG. 5, a more detailed diagram of a portion of one embodiment of the Rx circuit 26A is shown. Other Rx circuits 26B-26C may be similar. In the embodiment of FIG. 5, the Rx circuit 26A includes a decoder 50 (which includes a SPI decoder 52 and an HT decoder 54 including a PoHT BAR1 register 56), the H&R circuit 44A, an Rx buffer 58, a switch interface circuit 60, and a PDI_map register 62. The decoder 50 is coupled to receive input data on the interface 30A, and is coupled to provide an IVC and the packet data to the H&R circuit 44A. The decoder 50 is also coupled to provide the packet data to the Rx buffer 58 for storage. The H&R circuit 44A is configured to generate an SVC and optionally a next destination (next_dest) value, which are received by the Rx buffer 58. The Rx Buffer 58 is coupled to the switch 18 (particularly the data path of the switch 18) and is coupled to the switch interface circuit 60. The hash and route circuit 44A is coupled to the PDI_map register 62 as well.

The decoder 50 receives the input data from the interface 30A and decodes the data according to the SPI specification (in the SPI decoder 52) or the HT specification (in the HT decoder 54). One of the decoders 52 and 54 is active dependent on which interface 30A the Rx circuit 26A is coupled to. The active decoder 52 or 54 may be selected in any desired fashion. The PoHT extension to the HT interface defines an address range (stored in the PoHT BAR1 register 56) to which HT sized-write commands may be directed in order to transmit packet data. The IVC may be carried in the sequence ID field of the HT packet, and the least significant bits of the address may indicate whether the data is the start of packet, middle of packet, or end of packet, the number of valid bytes in the last doubleword of the HT packet, and an error status. If an HT sized-write is decoded, and the address is in the address range indicated by the PoHT BAR1 register, the HT packet is a PoHT packet and the data transmitted with the sized write is packet data.

Figure 6:
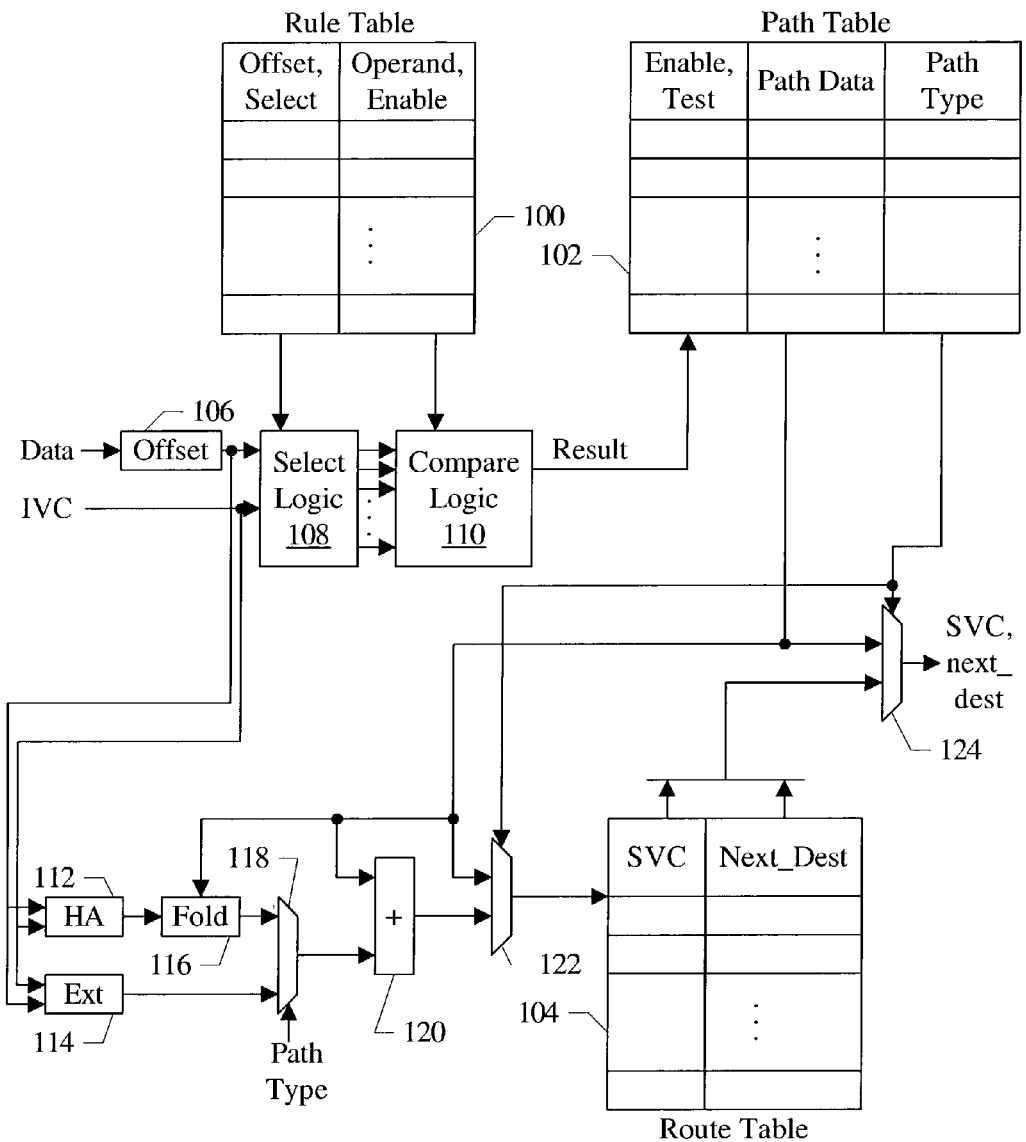
FIG. 6 is a block diagram of one embodiment of a hash and route circuit shown in FIG. 5.

The decoder 50 provides the IVC of the packet and the received packet data to the H&R circuit 44A. The H&R circuit 44A may select bytes of the packet data and/or the IVC and generate a corresponding SVC. While the H&R circuit 44A may implement any hashing and mapping function, one embodiment of the H&R circuit 44A is shown in FIG. 6 and described in more detail below. The packet data and the SVC output by the H&R circuit 44A are stored in the Rx buffer 58. The Rx buffer 58 may include storage for each IVC, which may be programmably allocated to the IVCs using configuration registers (not shown).

The switch interface circuit 60 may scan the packets stored in the Rx buffer 58 and generate requests for the switch 18. A request includes the SVC of the packet (the destination, e.g. the PDI 40 or one of the Tx circuits 28A-28C, and the virtual channel at that destination, e.g. the input queue for the PDI 40 or the OVC for the Tx circuits 28A-28C). The request may also include an end of packet indication (EOP) to indicate to the switch that the request, when granted, will be the end of the packet currently being transmitted by the Rx circuit 26A on the requested SVC. The request may also include a valid indication indicating whether or not a request is being made. When the switch grants the request, the switch returns the granted SVC to the switch interface circuit 60 (i.e. destination that is granted and the input queue or OVC at that destination that is granted). The grant may further include a valid indication indicating whether or not a grant is being given.

In one embodiment, the switch 18 grants one transfer through the switch per request. For example, in one implementation, 16 bytes of data may be transferred through the switch from one source to one destination in one transfer. Thus, multiple requests and grants for the same SVC may be used to transmit a packet to a given destination if the packet is larger than one transfer through the switch. The EOP indication does not indicate end of packet until the last request is made. The switch 18, once a given VC in a destination is granted to a source, inhibits granting other sources to that VC and destination until the EOP indication is received in a request from the granted source.

In response to a grant, the switch interface circuit 60 may cause the Rx buffer 58 to transfer the next 16 bytes of the packet corresponding to the granted SVC. The Rx buffer 58 may free the storage from which the 16 bytes were read in response to transferring the data through the switch 18.

It is noted that, while 16 bytes is used as an example above of one transfer through the switch 18, other embodiments may employ any size for the transfer. Transfers through the switch may also include, in addition to the data bytes being transferred, one or more bits of tag data carrying other information related to the data. For example, in some embodiments, tag data may include one or more of the following: a start of packet indication, an indication of the source, the IVC, the next_dest value, miscellaneous HT data from the PoHT write command, etc. Additionally, in some embodiments, there may also be a count field which, for packets, indicates the number of bytes being transferred. In some embodiments, the switch may support a reload interface by which a granted source or destination may request that the granted request be reloaded as another request (e.g. if the source has more data on that SVC to transmit or the destination has more space in that VC to receive data).

Turning now to FIG. 6, a block diagram of one embodiment of the H&R circuit 44A is shown. H&R circuits 44B-44C may be similar. In the embodiment of FIG. 6, the H&R circuit 44A includes a rule table 100, a path table 102, a route table 104, an offset circuit 106, a select logic circuit 108, a compare logic circuit 110, a hash circuit 112, an extract circuit 114, a fold circuit 116, a multiplexor (mux) 118, an adder 120, a mux 122, and a mux 124. The offset circuit 106 is coupled to receive packet data and has an output coupled to the select logic circuit 108, the hash circuit 112, and the extract circuit 114. The IVC corresponding to the packet data is provided to the select logic circuit 108, the hash circuit 112, and the extract circuit 114. The select logic 108 is coupled to the rule table 100 and to the compare logic circuit 110, which is also coupled to the rule table 100 and to provide a result to the path table 102. The path table 102 is coupled to the muxes 118, 122, and 124, the adder 120, and the fold circuit 116. The mux 124 is coupled to the route table 104. The mux 124 is further coupled to provide the SVC and optionally next_dest output of the H&R circuit 44A. The route table 104 is coupled to receive an index from the mux 122, which is also coupled to the adder 120. The adder 120 is coupled to the mux 118, which is coupled to the fold circuit 116 and the extract circuit 114. The fold circuit 116 is coupled to the hash circuit 112.

In one embodiment, the H&R circuit 44A may support a number of programmable rules. Each rule selects bytes from the data (or the IVC) and compares the selected data to an operand of the rule. Each rule may be evaluated on packet data and the true/false results of each comparison may select one of a set of paths. The path may be an SVC, an index to a route table which outputs an SVC, or may select the output of a hash function or an extract function as the index to the route table (added to a base address which is also part of the path data). Additionally, for HT interfaces, a next_dest may be output. The next_dest value indicates, to a Tx circuit 28A-28C on an HT interface, which base address to select from a table of base addresses for the write command comprising the PoHT packet. If the SVC indicates a PDI VC, the H&R circuit 44A may further use the mapping specified in the PDI_map register 62 to map the PDI VC to an input queue of the PDI 40. In other embodiments, the SVC stores in the H&R circuit 44A storage structures may directly specify the input queue of the PDI 40.

Generally, the rule table 100, the path table 102, and the route table 104 may comprise memories which are programmable by software to generate SVCs for packets in accordance with the above. In one implementation, the entries of the rule table 100, the path table 102, and the route table 104 may be mapped into the address space of the system 10 as configuration registers which may be read and written by software.

Each entry of the rule table 100 includes an offset and select field, and an operand and enable field. The offset field specifies the offset of a word (4 bytes, in one embodiment) in the packet that is to be compared to the operand in the operand field. The enable field is a bit vector used to mask the selected word prior to the comparison. The select field selects either the word specified by the offset or the IVC for comparison. The select logic circuit 108 is coupled to receive the offset and select fields from each entry and is configured to select the specified data from the packet data or IVC for comparison. The select logic circuit 108 may select data independently for each entry and provide the data to the compare logic circuit 110. The compare logic circuit 110 may independently compare each selected data (masked by the enable field of the corresponding rule table entry) to the operand from the corresponding rule table entry. The results of the comparisons are provided to the path table 102. The results may include an indication of whether each comparison resulted in a true or false outcome. The number of entries in the rule table 100 may vary from embodiment to embodiment. In one implementation, there may be 16 rule entries allowing up to 16 programmable rules. In one embodiment, the offsets specified in the rule table are relative to a programmable offset from the beginning of the packet data. The offset circuit 106 may offset the packet data by the programmable offset. In one embodiment, the programmable offset may be direct (i.e. the programmed value may be the offset). In another embodiment, the programmable offset may be indirect (i.e. the programmed value may identify an offset field within the packet data that carries the offset for a given packet). In still another embodiment, the programmable offset may be programmable to be either direct or indirect.

The path table 102 may comprise a set of entries, each of which includes an enable and test field, a path data field, and a path type field. The enable and test field is used to program which results from the compare logic circuit 110 are used to determine if the path entry is used for this packet (via bits in the enable field corresponding to each result) and the test value may indicate whether the corresponding result is tested for true or false. If each enabled result tests the same as the test value specifies, the path table entry is selected. The path table 102 outputs the path data and path type fields from the selected path table entry. The path type field indicates one of several path types, controlling the muxes 118, 122, and 124 and indicating the nature of the path data. In an immediate path type, the SVC and optionally next_dest are specified in the path data. For the immediate path type, the mux 124 selects the path data through the mux 124. If the path type is not immediate, the output of the route table 104 is selected through the mux 124. Any number of path table entries may be supported in various embodiments, including different numbers of entries than the number of rule table entries. In one implementation, the path table 102 may include 16 entries and a 17$^{th}$ (default) entry that is selected if none of the other 16 entries match the result of the compare logic circuit 110.

The route table 104 includes several entries, each storing an SVC and a next_dest value. The route table 104 receives an index generated in several possible fashions depending on the path type field. If the path type is a index path type, the path data is an index into the route table 104 and the path data is selected through the mux 122. Otherwise, the output of the adder 120 is selected through the mux 122 as the index to the route table 104.

In the remaining path types, the path data may include a base address used (by adder 120) to generate the index of the route table. In a hash path type, the output of the hash circuit 112 (a hash value) is added to the base address to generate the index (and is selected through the mux 118 to the adder 120). The hash circuit 112 may be programmed to select up to 10 words from the packet data, mask the words with programmable enable vectors, and hash them to produce the hash value. In one embodiment, there are 512 entries in the route table 104. In such an embodiment, the hash function may generate an 8 bit hash value (to be added to a base address of, e.g., 9 bits, at the adder 120). Additionally, in some embodiments, the path data may include a fold control which folds the hash value to a smaller value (e.g. programmably 7 bits or 6 bits in one embodiment) to reduce the portion of the route table 104 selectable via the hash circuit 112. In one implementation, the hash function bitwise XORs the upper two bytes and lower two bytes of each word to produce two bytes, then XORs adjacent sets of two bits to produce one byte (8 bits). The bytes of resulting from each word may be bitwise XOR'd to produce the hash value. The optional folding may XOR bits 7 and 5 of the hash value (numbering bits 7 to 0 from most significant to least significant) to produce bit 5 of the fold, zero bit 7, and provide the remaining hash value bits unmodified to produce a 7 bit fold, in one embodiment. To produce a 6 bit fold, one implementation may XOR bits 7 and 5 of the hash value to produce bit 5 of the fold, XOR bits 6 and 4 of the hash value to produce bit 4 of the fold, zero bits 7 and 6, and provide the remaining hash value bits unmodified to produce a 6 bit fold. If folding is not selected, the fold circuit 116 provides the unmodified hash value as the output. In other embodiments, two or more hash functions may be independently programmable in the hash circuit 112, and may be selected using the path type field.

The extract circuit 114 may be programmable to select two nibbles (4 bits) from the packet data to produce the 8 bit input to the adder 120. The two nibbles may be programmed independently and thus may be non-consecutive in the packet. In other embodiments, two or more extract functions may be programmed into the extract circuit 114 and selected using the path type field. In other embodiments, the extract result may be folded in a manner similar to the hash value.

While the embodiment of FIG. 6 provides a variety of mechanisms for generating an SVC, other embodiments may provide any subset of one or more of the direct SVC generation, the index from the path table to the route table, the hash mechanism, or the extract mechanism. Any size route table may be supported, and thus the hash value and extract result sizes may be varied.

Figure 7:
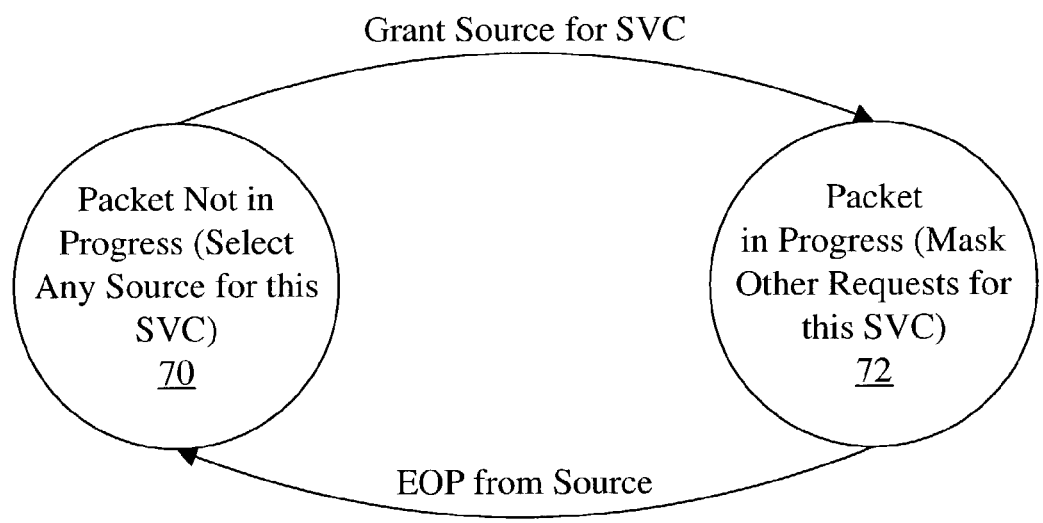
FIG. 7 is a state machine diagram illustrating one embodiment of packet boundary aware switching.

Turning next to FIG. 7, a state machine diagram is shown which illustrates operation of one embodiment of the switch with respect to one SVC (one destination and input queue or OVC at that destination). A similar state machine may apply to each SVC.

In the packet not in progress state 70, the switch 18 may select any source to transfer data on the SVC. In state 70, the switch 18 may use any selection mechanism to select among requesters for the SVC. In one embodiment, the switch 18 uses a round robin selection scheme for the PDI 40 input queues and uses a programmable weighted round robin with priority scheme for the Tx circuits 28A-28C. In the programmable weighted round robin with priority scheme, each source may be programmed as high priority or low priority, and may be given a weight. In one implementation, the switch maintains deficit counters indicating how many transfers each source has not been able to transfer (based on its weight) on the SVC, and selects the requesting source with the highest deficit.

Once a source has been selected, the switch 18 transitions to the packet in progress state 72. In this state, the switch 18 records the source that was granted for this SVC and masks requests from other sources. Thus, the source that was previously granted is the only source that will be granted on the SVC. The switch may grant other sources for other SVCs corresponding to the same destination (e.g. other input queues or other OVCs). The switch 18 remains in this state until a request is granted to the source and the EOP indication with the request indicates end of packet. The switch 18 then transitions to the state 70 and selects the next source.

Figure 8:
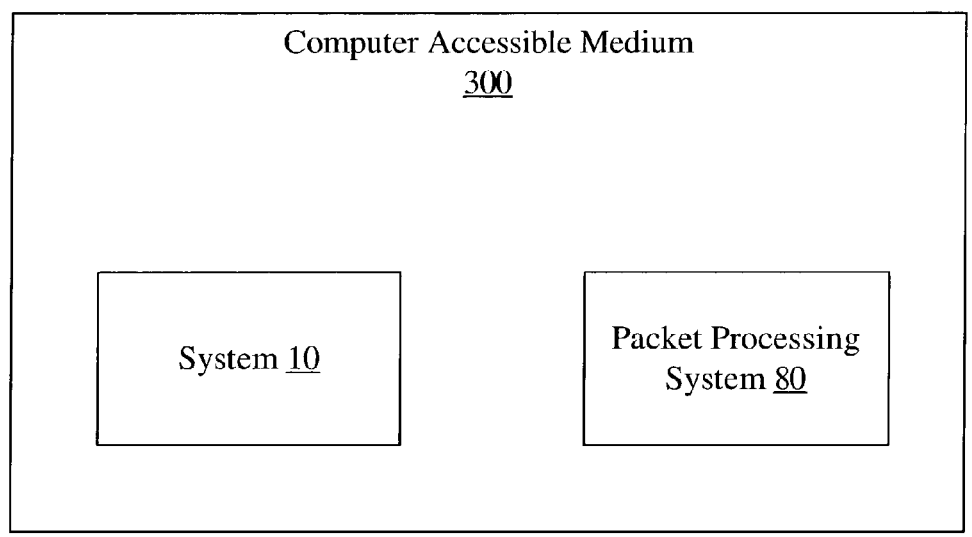
FIG. 8 is a block diagram of one embodiment of a computer accessible medium.

Turning next to FIG. 8, a block diagram of a computer accessible medium 300 including one or more data structures representative of the circuitry included in the system 10 and/or the packet processing system 80 is shown. Generally speaking, a computer accessible medium may include storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer accessible medium 300 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium 300 may be the netlist(s) (with or without the synthesis library) or the data set(s), as desired. In yet another alternative, the data structures may comprise the output of a schematic program, or netlist(s) or data set(s) derived therefrom.

While computer accessible medium 300 includes a representation of the system 10 and/or the packet processing system 80, other embodiments may include a representation of any portion of the system 10 and/or the packet processing system 80 (e.g. processors 12A-12N, memory controller 14, interconnect 22, packet DMA circuit 16 (or portions thereof), switch 18, interface circuits 22A-22C (or portions thereof), systems 10A and/or 10B (or portions thereof), packet source/destination devices 90A-90D, or portions thereof, etc.).

Numerous variations and modifications will become apparent to those skilled in the art once the above disclosure is fully appreciated. It is intended that the following claims be interpreted to embrace all such variations and modifications.

What is claimed is:

1. An apparatus comprising:
    a first receive circuit configured to couple to a first interface to receive a first plurality of packets, wherein the first receive circuit is configured, for each packet of the first plurality of packets, to select a destination from one of a plurality of destinations and wherein the first receive circuit is further configured to select, for each packet, one of the plurality of virtual channels on a destination of that packet;
    a second receive circuit configured to couple to a second interface to receive a second plurality of packets, wherein the second receive circuit is configured, for each packet of the second plurality of packets, to select a destination from one of the plurality of destinations and wherein the second receive circuit is further configured to select, for each packet, one of a plurality of virtual channels on the destination of that packet;
    a plurality of transmit circuits configured to transmit packets on respective interfaces, wherein the plurality of destinations comprises the plurality of transmit circuits;
    a packet direct memory access (DMA) circuit, wherein the packet DMA circuit is configured to communicate packets to and from a memory controller, and wherein the packet DMA circuit is one of the plurality of destinations; and
    a switch coupled to the first receive circuit, the second receive circuit, and the plurality of destinations, wherein the switch is configured to couple the first receive circuit and the second receive circuit to select ones of the plurality of destinations to convey packets from the first receive circuit and the second receive circuit to the select ones of the plurality of destinations;
    wherein the first receive circuit, the second receive circuit, the plurality of destinations, and the switch are integrated onto an integrated circuit.

2. The apparatus as recited in claim 1 wherein the plurality of transmit circuits include a first transmit circuit configured to couple to the first interface and a second transmit circuit configured to couple to the second interface.

3. The apparatus as recited in claim 1 wherein, if: (i) the first receive circuit receives a first packet for a first destination and a first virtual channel on the first destination; and (ii) the second receive circuit receives a second packet for the first destination and the first virtual channel on the first destination; the switch is configured to select a selected one of the first receive circuit or the second receive circuit to transmit the first packet or the second packet, and wherein the switch is configured to inhibit selecting the other one of the first receive circuit or the second receive circuit until the selected one reaches a packet boundary.

4. The apparatus as recited in claim 1 wherein the first receive circuit is programmable to select the destination for each of the first plurality of packets.

5. The apparatus as recited in claim 4 wherein the first receive circuit comprises a hash and route circuit coupled to receive at least a portion of each of the plurality of packets and a virtual channel on which that packet is received, and wherein the hash and route circuit is programmable to select the destination responsive to one or both of the portion of that packet and the virtual channel on which that packet is received.

6. The apparatus as recited in claim 1 further comprising the memory controller integrated onto the integrated circuit, wherein the memory controller is configured to couple to a memory, and wherein the packet DMA circuit is configured to transmit packets received by the packet DMA circuit to the memory controller for storage in the memory.

7. The apparatus as recited in claim 6 wherein the packet DMA circuit is further configured to transmit packets to one of the plurality of destinations.

8. The apparatus as recited in claim 7 wherein the switch is configured to couple the packet DMA circuit to the one of the plurality of destinations.

9. The apparatus as recited in claim 1 wherein the first receive circuit is configured to select a first destination of the plurality of destinations for a first packet of the first plurality of packets, and wherein the first receive circuit is configured to select a second destination of the plurality of destinations for a second packet of the first plurality of packets, wherein the first destination is different from the second destination.

10. A method comprising:
    receiving a first plurality of packets in a first receive circuit of an integrated circuit;
    selecting a destination from one of a plurality of destinations for each packet of the first plurality of packets by selecting one of a plurality of virtual channels on a destination of that packet;
    receiving a second plurality of packets in a second receive circuit of the integrated circuit;
    selecting a destination from one of the plurality of destinations for each packet of the second plurality of packets by selecting one of a plurality of virtual channels on the destination of that packet;
    coupling the first receive circuit and the second receive circuit to select ones of the plurality of destinations via a switch in the integrated circuit to convey packets, wherein the integrated circuit includes a plurality of transmit circuits configured to transmit packets on respective interfaces of the integrated circuit, and wherein the plurality of destinations includes the plurality of transmit circuits, and wherein the integrated circuit further includes a packet direct memory access (DMA) Circuit, wherein the packet DMA circuit is configured to communicate packets to and from a memory controller, and wherein the packet DMA circuit is one of the plurality of destinations.

11. The method as recited in claim 10 further comprising, if: (i) the first receive circuit receives a first packet for a first destination and a first virtual channel on the first destination; and (ii) the second receive circuit receives a second packet for the first destination and the first virtual channel on the first destination:
    selecting a selected one of the first receive circuit or the second receive circuit to transmit the first packet or the second packet; and
    inhibiting selecting the other one of the first receive circuit or the second receive circuit until the selected one reaches a packet boundary.

12. The method as recited in claim 10 further comprising programming the first receive circuit to select the destination for each of the first plurality of packets.

13. The method as recited in claim 12 wherein the first receive circuit comprises a hash and route circuit coupled to receive at least a portion of each of the plurality of packets and a virtual channel on which that packet is received, and wherein programming the first transmit circuit to select the destination for each of the first plurality of packets comprises programming the hash and route circuit to select the destination responsive to one or both of the portion of that packet and the virtual channel on which that packet is received.

14. A computer-readable storage medium embodying computer executable data structures to perform a function of a circuit, comprising:
   a first receive circuit configured to couple to a first interface to receive a first plurality of packets, wherein the first receive circuit is configured, for each packet of the first plurality of packets, to select a destination from one of a plurality of destinations and wherein the first receive circuit is further configured to select, for each packet, one of a plurality of virtual channels on the destination of that packet;
   a second receive circuit configured to couple to a second interface to receive a second plurality of packets, wherein the second receive circuit is configured, for each packet of the second plurality of packets, to select a destination from one of the plurality of destinations and wherein the second receive circuit is further configured to select, for each packet, one of a plurality of virtual channels on the destination of that packet;
   a plurality of transmit circuits configured to transmit packets on respective interfaces, wherein the plurality of destinations comprises the plurality of transmit circuits;
   a packet direct memory access (DMA) circuit, wherein the packet DMA circuit is configured to communicate packets to and from a memory controller, and wherein the packet DMA circuit is one of the plurality of destinations; and
   a switch coupled to the first receive circuit, the second receive circuit, and the plurality of destinations, wherein the switch is configured to couple the first receive circuit and the second receive circuit to select ones of the plurality of destinations to convey packets from the first receive circuit and the second receive circuit to the select ones of the plurality of destinations;
   wherein the first receive circuit, the second receive circuit, the plurality of destinations, and the switch are integrated onto an integrated circuit.

15. The computer-readable storage medium as recited in claim 14 wherein the plurality of transmit circuits include a first transmit circuit configured to couple to the first interface and a second transmit circuit configured to couple to the second interface.

16. The computer-readable storage medium as recited in claim 14 wherein, if: (i) the first receive circuit receives a first packet for a first destination and a first virtual channel on the first destination; and (ii) the second receive circuit receives a second packet for the first destination and the first virtual channel on the first destination; the switch is configured to select a selected one of the first receive circuit or the second receive circuit to transmit the first packet or the second packet, and wherein the switch is configured to inhibit selecting the other one of the first receive circuit or the second receive circuit until the selected one reaches a packet boundary.

17. The computer-readable storage medium as recited in claim 14 wherein the first receive circuit is programmable to select the destination for each of the first plurality of packets.

18. The computer-readable storage medium as recited in claim 17 wherein the first receive circuit comprises a hash and route circuit coupled to receive at least a portion of each of the plurality of packets and a virtual channel on which that packet is received, and wherein the hash and route circuit is programmable to select the destination responsive to one or both of the portion of that packet and the virtual channel on which that packet is received.

19. The computer-readable storage medium as recited in claim 14 wherein the packet DMA circuit is further configured to transmit packets to one of the plurality of destinations.

20. The computer-readable storage medium as recited in claim 19 wherein the switch is configured to couple the packet DMA circuit to the one of the plurality of destinations.

21. The computer-readable storage medium as recited in claim 14 wherein the first receive circuit is configured to select a first destination of the plurality of destinations for a first packet of the first plurality of packets, and wherein the first receive circuit is configured to select a second destination of the plurality of destinations for a second packet of the first plurality of packets, wherein the first destination is different from the second destination.

* * * * *